(12) United States Patent
Terai

(10) Patent No.: US 9,609,591 B2
(45) Date of Patent: Mar. 28, 2017

(54) COMMUNICATION DEVICE, POWER MANAGEMENT SYSTEM HAVING COMMUNICATION DEVICE AND CONTROL METHOD OF COMMUNICATION DEVICE

(71) Applicant: KYOCERA CORPORATION, Kyoto (JP)

(72) Inventor: Ryota Terai, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 120 days.

(21) Appl. No.: 14/388,467

(22) PCT Filed: Mar. 28, 2013

(86) PCT No.: PCT/JP2013/002129
§ 371 (c)(1),
(2) Date: Sep. 26, 2014

(87) PCT Pub. No.: WO2013/145756
PCT Pub. Date: Oct. 3, 2013

(65) Prior Publication Data
US 2015/0085726 A1     Mar. 26, 2015

(30) Foreign Application Priority Data

Mar. 28, 2012   (JP) ................................ 2012-075154

(51) Int. Cl.
*G08C 17/00*     (2006.01)
*H04W 52/02*     (2009.01)
(Continued)

(52) U.S. Cl.
CPC ..... *H04W 52/0209* (2013.01); *H02J 13/0075* (2013.01); *H04L 5/0053* (2013.01);
(Continued)

(58) Field of Classification Search
CPC .................................................. H02J 13/0075
See application file for complete search history.

(56) References Cited

U.S. PATENT DOCUMENTS

| 6,731,223 B1 | 5/2004 | Partyka |
| 2005/0114721 A1* | 5/2005 | Azadet .............. H04W 52/0277 713/320 |

(Continued)

FOREIGN PATENT DOCUMENTS

| JP | 2000-201441 A | 7/2000 |
| JP | 2006-129341 A | 5/2006 |

(Continued)

OTHER PUBLICATIONS

Extended European Search Report dated Oct. 13, 2015 issued by the European Patent Office for Counterpart European Application No. EP 13 769 173.9.

(Continued)

*Primary Examiner* — Joey Bednash
*Assistant Examiner* — Kevin Cunningham
(74) *Attorney, Agent, or Firm* — Procopio Cory Hargreaves and Savitch LLP

(57) ABSTRACT

Provided is a communication device including an acquisition unit configured to acquire the electrical quantity of a power load, a communication unit configured to wirelessly transmit a packet including the electrical quantity acquired to a master unit that wirelessly transmits a control signal that controls the electrical quantity of a plurality of loads, and a controller configured to switch operation of the communication unit to a second mode in which the packet is wirelessly transmitted without specifying a destination when the electrical quantity equal to or greater than a first reference value is acquired during operation of the communication (Continued)

unit in a first mode in which the packet is wirelessly transmitted to the base station by specifying a destination.

18 Claims, 18 Drawing Sheets

(51) Int. Cl.
    *H04Q 9/00*     (2006.01)
    *H04L 5/00*     (2006.01)
    *H04W 52/18*     (2009.01)
    *H02J 13/00*     (2006.01)

(52) U.S. Cl.
    CPC .............. *H04Q 9/00* (2013.01); *H04W 52/18* (2013.01); *H04Q 2209/40* (2013.01); *H04Q 2209/60* (2013.01); *H04Q 2209/823* (2013.01); *Y02E 60/7853* (2013.01); *Y04S 40/126* (2013.01)

(56) References Cited

U.S. PATENT DOCUMENTS

| | | |
|---|---|---|
| 2006/0092894 A1 | 5/2006 | Amano |
| 2006/0188252 A1* | 8/2006 | Schluter .............. H04J 14/0227 398/25 |
| 2007/0293229 A1* | 12/2007 | Khan .................. H04W 72/005 455/450 |
| 2008/0144497 A1* | 6/2008 | Ramprashad ....... H04L 41/0893 370/230.1 |
| 2008/0270421 A1* | 10/2008 | Ushiyama ........ H04N 21/23103 |
| 2009/0028258 A1* | 1/2009 | Ma ...................... H04L 27/2602 375/260 |
| 2011/0078063 A1 | 3/2011 | Cahill-O'Brien et al. |
| 2012/0022711 A1 | 1/2012 | Sakaguchi et al. |
| 2012/0163279 A1 | 6/2012 | Tran et al. |
| 2012/0197455 A1* | 8/2012 | Lee .......................... H02J 3/008 700/296 |
| 2012/0207075 A1* | 8/2012 | Nagaraj ................. H04H 20/42 370/312 |
| 2013/0074127 A1* | 3/2013 | Kotecha ................. H04N 21/84 725/54 |

FOREIGN PATENT DOCUMENTS

| | | |
|---|---|---|
| JP | 2008-311702 A | 12/2008 |
| JP | 3159359 U | 4/2010 |
| JP | 2011-239470 A | 11/2011 |
| WO | 2011/070762 A1 | 6/2011 |
| WO | 2012-005000 A1 | 1/2012 |

OTHER PUBLICATIONS

International Search Report; PCT/JP2013/002129; Jun. 25, 2013.
Written Opinion of the International Searching Authority; PCT/JP2013/002129; Jun. 25, 2013; with English language concise explanation.

\* cited by examiner

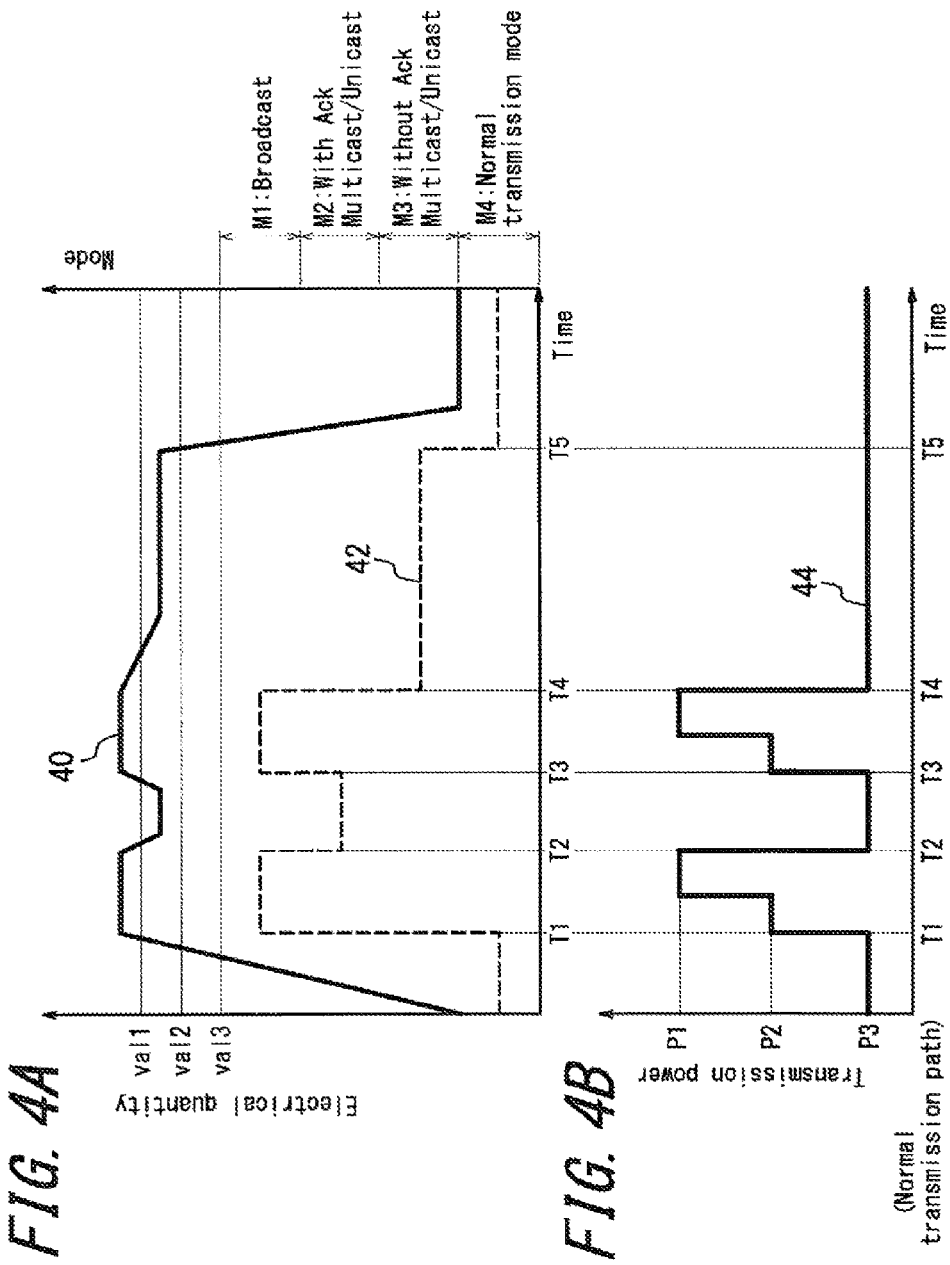

FIG. 5A
TBL1

| CNT = | 1 | 2 | 3 | 4 | 5 | 6 |
|---|---|---|---|---|---|---|
| L1 | M1 | M1 | M2 | M2 | M3 | M4 |
| L2 | M2 | M2 | M3 | M3 | M3 | M4 |
| L3 |  |  |  |  | M3 | M4 |
| L4 |  |  |  |  | M3 | M4 |

Electrical quantity: val1, val2, val3 → Time

FIG. 5B
TBL3

| CNT = | 1 | 2 | 3 | 4 | 5 | 6 |
|---|---|---|---|---|---|---|
| L1 | M3 | M3 | M3 | M3 | M3 | M4 |
| L2 | M3 | M3 | M3 | M3 | M3 | M4 |
| L3 |  |  |  |  |  | M4 |
| L4 |  |  |  |  |  | M4 |

Electrical quantity: val1, val2, val3 → Time

FIG. 5C
P_TBL1

| CNT = | 1 | 2 | 3 | 4 | 5 | 6 |
|---|---|---|---|---|---|---|
| L1 | P2 | P1 | P3 | P3 | P3 | P3 |
| L2 | P3 | P3 | P3 | P3 | P3 | P3 |
| L3 |  |  |  |  |  | P3 |
| L4 |  |  |  |  | P3 | P3 |

FIG. 5D
P_TBL3

| CNT = | 1 | 2 | 3 | 4 | 5 | 6 |
|---|---|---|---|---|---|---|
| L1 | P3 | P3 | P3 | P3 | P3 | P3 |
| L2 | P3 | P3 | P3 | P3 | P3 | P3 |
| L3 |  |  |  |  |  | P3 |
| L4 |  |  |  |  |  | P3 |

FIG. 11A

TBL2

| | CNT=1 | 2 | 3 | 4 | 5 | 6 |
|---|---|---|---|---|---|---|
| L1 | M1 | M1 | M2 | M2 | M3 | M4 |
| L2 | M1 | M1 | M3 | M3 | M3 | M4 |
| L3 | M2 | M2 | M3 | M3 | M3 | M4 |
| L4 | | | | | | M4 |

Electrical quantity (val1, val2, val3) vs Time

FIG. 11B

P_TBL2

| | CNT=1 | 2 | 3 | 4 | 5 | 6 |
|---|---|---|---|---|---|---|
| L1 | P2 | P2 | P3 | P3 | P3 | P3 |
| L2 | P2 | P2 | P3 | P3 | P3 | P3 |
| L3 | P3 | P3 | P3 | P3 | P3 | P3 |
| L4 | | | | | | P3 |

COMMUNICATION DEVICE, POWER MANAGEMENT SYSTEM HAVING COMMUNICATION DEVICE AND CONTROL METHOD OF COMMUNICATION DEVICE

CROSS REFERENCE TO RELATED APPLICATION

This application claims priority to and the benefit of Japanese Patent Application No. 2012-075154 filed on Mar. 28, 2012, the entire contents of which are incorporated herein by reference.

TECHNICAL FIELD

The present invention relates to a communication device that acquires electrical quantity consumed by a power load and transmits it to a master unit, a power management system having a master unit and the communication device and a control method of the communication device.

BACKGROUND ART

In recent years, in the context of the concerns of power shortage and requirements for global environmental protection, power saving is required in every household, store, building or the like. For detailed example, the electrical power demand increases in summers and winters, and power consumption by every household, store and building may exceed the contract power. Thus, in order to save the power efficiently to prevent the power consumption from exceeding the contract power, a power management system by which power consumption in every household, store or building is monitored and power consumption by each electrical product (hereinafter referred to as a power load) is controlled (what is called a HEMS (Home Energy Management System)) has been proposed. In HEMS, power consumption by each power load is detected by a power sensor, and the data of the detected power consumption is collected by a master unit through wireless communication. Then, the master unit transmits a control signal to each power load corresponding to the power consumption while monitoring the power consumption, thus the power consumption by each power load can be reduced efficiently.

When the number of power loads to be controlled increases, the frequency of transmitting the power consumption data from a power sensor increases and an error is caused by congestion, thus the power consumption data may not reach the master unit. Therefore, for example, a method by which, when the communication quality declines, the power consumption data is transmitted in a transmission mode with a high resistance to an error has been devised (e.g. Patent Literature 1).

CITATION LIST

Patent Literature

Patent Literature 1: JP2006129341 (A)

SUMMARY OF INVENTION

However, even if a transmission mode is sought to be changed to one with a high error resistance when the communication quality is declined, in some communication standards, such change may not be performed. For example, in the standard such as IEEE802.11 or the like, a transmission mode with a high error resistance, such as BPSK (Binary Phase Shift Keying), is defined as a specification. However, in the standard such as IEEE802.15.4 or the like, since there is only a single transmission mode, a transmission mode cannot be changed based on the communication quality. In addition, when a transmission mode by coding system with a high error resistance is used, there is a decrease in the transmission efficiency. Then, as a method that does not depend on a communication standard, when there is a decline in the communication quality, even if the data communication frequency is increased to stochastically secure a reliable data transmission, communication load of the overall HEMS increases and congestion may occur at a higher frequency. The occurrence of congestion may cause the following problem. For example, in Japan, an end user, who is a consumer of the power, may previously set a demand per thirty minutes, which is a target value of power consumption, and enter into a contract of a rate structure, which allows power rate saving, with an electric power provider. Under such a rate structure, when the power consumption by the end user is transmitted in a power management system in which the demand is managed by the electric power provider, if the data that should be transmitted to the electric power provider does not reach the power management server due to congestion, the power consumption may exceed the contract power.

The present invention has been conceived in light of the above mentioned circumstances and provides a communication device that can transmit the data of electrical quantity reliably to the master unit, a power management system and a control method of the communication device.

According to a first aspect of the present invention to solve the above mentioned problem, a communication device includes an acquisition unit configured to acquire data of electrical quantity from a power load, a communication unit configured to wirelessly transmit a packet including the data of electrical quantity acquired to a master unit which wirelessly transmits a control signal that controls electrical quantity consumed by a plurality of power loads, and a controller configured to switch an operation of the communication unit from a first mode, in which the packet is wirelessly transmitted to the base station by specifying a destination, to a second mode, in which the packet is wirelessly transmitted without specifying a destination of the packet, when the data of electrical quantity equal to or greater than a first reference value is acquired during the first mode. The electrical quantity of the above mentioned power load is, for example, the electrical quantity consumed by the power load.

According to a preferred form of the above mentioned aspect, the communication unit wirelessly transmits the packet in the second mode at a frequency equal to or greater than that in the first mode and with a transmission power equal to or greater than that in the first mode.

According to a preferred form of the above mentioned aspect, the controller increases a transmission power when the communication unit operates in the second mode and, after elapse of a predetermined period of time, switches the operation of the communication unit to a third mode in which the packet is wirelessly transmitted at a frequency lower than that in the second mode and equal to or greater than that in the first mode and with a transmission power equal to or smaller than that in the second mode.

According to another preferred form of the above mentioned aspect, even if the data of electrical quantity equal to or greater than the first reference value is acquired, the controller switches the operation of the communication unit, when the packet wirelessly transmitted through broadcast by the other communication device is received, to a third mode in which the packet is wirelessly transmitted at a frequency lower than that in the second mode and equal to or greater than that in the first mode and with a transmission power equal to or smaller than that in the second mode.

According to still another preferred form of the above mentioned aspect, when a packet indicating that the packet transmitted is received by the other slave unit during operation of the communication unit in the second mode, the controller switches, even before elapse of the predetermined period of time, the operation of the communication unit to the third mode in which the packet is transmitted at a frequency lower than that in the second mode and equal to or greater than that in the first mode.

According to yet another preferred form of the above mentioned aspect, the controller switches, when the data of electrical quantity equal to or greater than a second reference value is acquired during operation of the communication unit in the third mode, the operation of the communication unit to the second mode.

According to further another preferred form of the above mentioned aspect, the controller decreases, when the packet wirelessly transmitted by the other communication device in the second mode is received, the first reference value.

According to still further preferred form of the above mentioned aspect, when the packet wirelessly transmitted by the other communication device in the second mode is received during operation of the communication unit in the first mode, the controller switches, even if the data of electrical quantity equal to or greater than the first reference value is acquired, the operation of the communication unit to the third mode in which the packet is transmitted at a frequency lower than that in the second mode and equal to or greater than that in the first mode.

In the above mentioned aspect, the second mode is a mode in which the packet is transmitted through broadcast, and the third mode is a mode in which the packet is transmitted through multicast or unicast.

According to yet another form of the above mentioned aspect, a communication system including the master unit and the communication device is provided.

Although the solution to problem of the present invention has been described as a device, the present invention may also be achieved by a method or a program substantially equivalent to the above device, or by a storage medium having such a program recorded thereon. These are also to be understood as included in the scope of the present invention. Note that in each step of method or program, a processing unit such as CPU and DSP is used according to the data processing, and input data and processed/generated data are stored in a storage device such as HDD and memory.

For example, a control method of a communication device that realizes the present invention as a method is a control method of a communication device of a power management system that manages electrical quantity consumed by a power load, the method including: wirelessly transmitting a packet including the data of electrical quantity to a master unit that wirelessly transmits a control signal that controls the electrical quantity of a plurality of power loads; a first mode in which the packet is wirelessly transmitted to the master unit by specifying a destination; a second mode in which the packet is wirelessly transmitted without specifying a destination; and a step of switching from the first mode to the second mode when the data of electrical quantity equal to or greater than a reference value is acquired in the first mode.

In addition, another aspect of the present invention relates to a power management system that includes a communication device capable of wirelessly communicating with a master unit and manages electrical quantity consumed by a power load. In this power management system, the master unit wirelessly transmits a control signal that controls electrical quantity consumed by a plurality of power loads, and the communication device includes an acquisition unit configured to acquire data of electrical quantity from a power load, a communication unit configured to wirelessly transmit a packet including the data of electrical quantity acquired, and a controller configured to switch, when the data of electrical quantity equal to or greater than a first reference value is acquired during operation of the communication unit in a first mode in which the packet is wirelessly transmitted to the master unit by specifying a destination, operation of the communication unit to a second mode in which the packet is wirelessly transmitted without specifying a destination.

According to the embodiment of the present invention described below, the data of electrical quantity of a power load can be reliably transmitted to a master unit, thereby allowing control of the electrical quantity of the power load.

BRIEF DESCRIPTION OF DRAWINGS

FIGS. 4A and 4B are diagrams respectively illustrating an operation of the communication device according to a first example;

FIGS. 5A to 5D are diagrams respectively illustrating an example of a transmission mode table;

FIGS. 11A and 11B are diagrams illustrating respectively a transmission mode table in the second example;

DESCRIPTION OF EMBODIMENTS

The embodiment of the present invention is described below.

Figure 1:
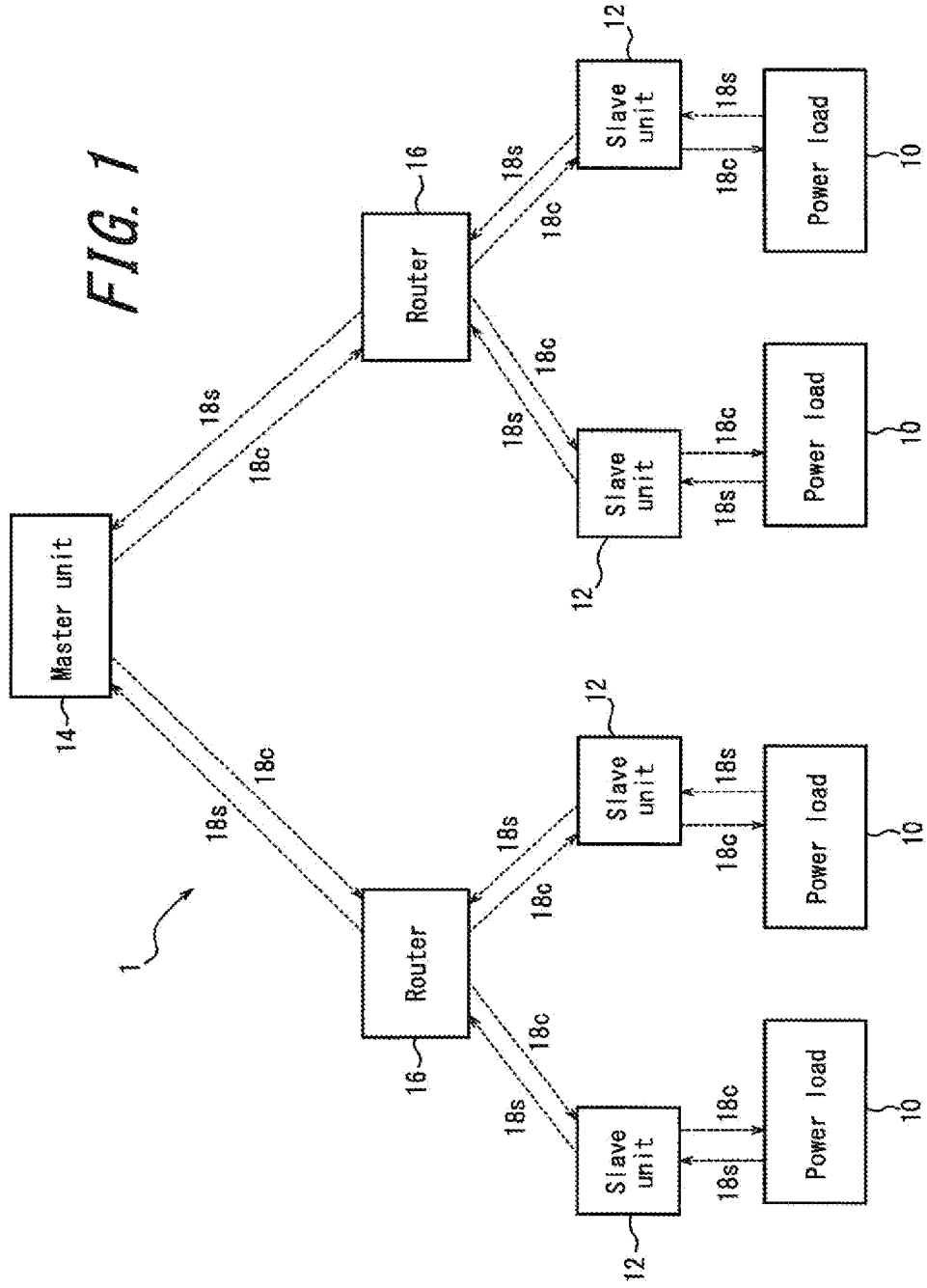
FIG. 1 is a diagram for illustrating a configuration example of a network system to which a communication device according to the present embodiment is applied.

FIG. 1 a diagram for illustrating a configuration example of a network system to which a communication device according to the present embodiment is applied. This network system 1 is, for example, so-called HEMS (Home Energy Management System). The network system 1 includes a plurality of power loads 10, a plurality of slave units 12 each configured to receive each data of electrical quantity 18s from each power load 10, a master unit 14 configured to receive each data of electrical quantity 18s from each slave unit 12, monitor them and wirelessly transmit a control signal 18c that controls the electrical quantity of each power load 10 corresponding to each data of electrical quantity 18s, and a router 16 configured to mediate the data transmission from each slave unit 12 to the master unit 14 and the signal transmission from the master unit 14 to each power load 10. The electrical quantity of the load 10 in the present embodiment is electrical quantity of current or power consumed by a power load 10.

The network system 1 is implemented using, for example, the ZigBee standard for a short-distance wireless communication in a relatively narrow space such as a house. Although a wireless device equipped with a ZigBee device has a small memory capacity and the number of nodes through which the master unit 14 transmits/receives data directly is limited, the network system 1 performs routing through a router 16, thereby allowing a data communication between slave units 12 and power loads 10 whose number is greater than the limited number and the master unit 14. Note that the present invention is not limited to the ZigBee standard, and can be applied to protocols such as SEP (Smart Energy Profile), ECHONET Lite operated using, for example, wireless standards such as BlueTooth (registered trademark) and a wireless LAN.

The power load 10 is, for example, home appliances such as, for example, air conditioners and refrigerators, or various digital equipment such as, for example, TV sets and personal computers. The slave unit 12 includes, for example, a power sensor configured to detect the data of electrical quantity 18s wirelessly or wired from the power load and a communication device configured to acquire the data of electrical quantity 18s from the power sensor and transmit it wirelessly to the master unit 14. The master unit 14 includes, for example, a communication device as "Coordinator" configured to receive the data of electrical quantity 18s transmitted from the slave unit 12 or the router 16 and a host computer configured to collect each data of electrical quantity 18s received by the Coordinator and monitor them. When the master unit 14 detects a sudden change in the electrical quantity or a high load exceeding a predetermined reference value in the host computer, it wirelessly transmits a control signal 18c that controls the electrical quantity to the power load 10.

In the network system 1, in order to avoid the situation where the consumed electrical quantity increases and exceeds the contract power, then shutdown of a breaker is caused, the master unit 14 should reliably control the power load 10. Therefore, the data of electrical quantity should be transmitted reliably from the slave unit 12 to the master unit 14. Thus, in the present embodiment, when each slave unit 12 wirelessly transmits the acquired data of electrical quantity periodically, e.g. at a frequency of several times per minute, based on the route set in the routing table, through the router 16 by specifying a destination (hereinafter referred to as a normal transmission mode), if the data of electrical quantity increases suddenly, the slave unit 12 transmits the data of electrical quantity through broadcast without specifying a destination.

Figure 2:
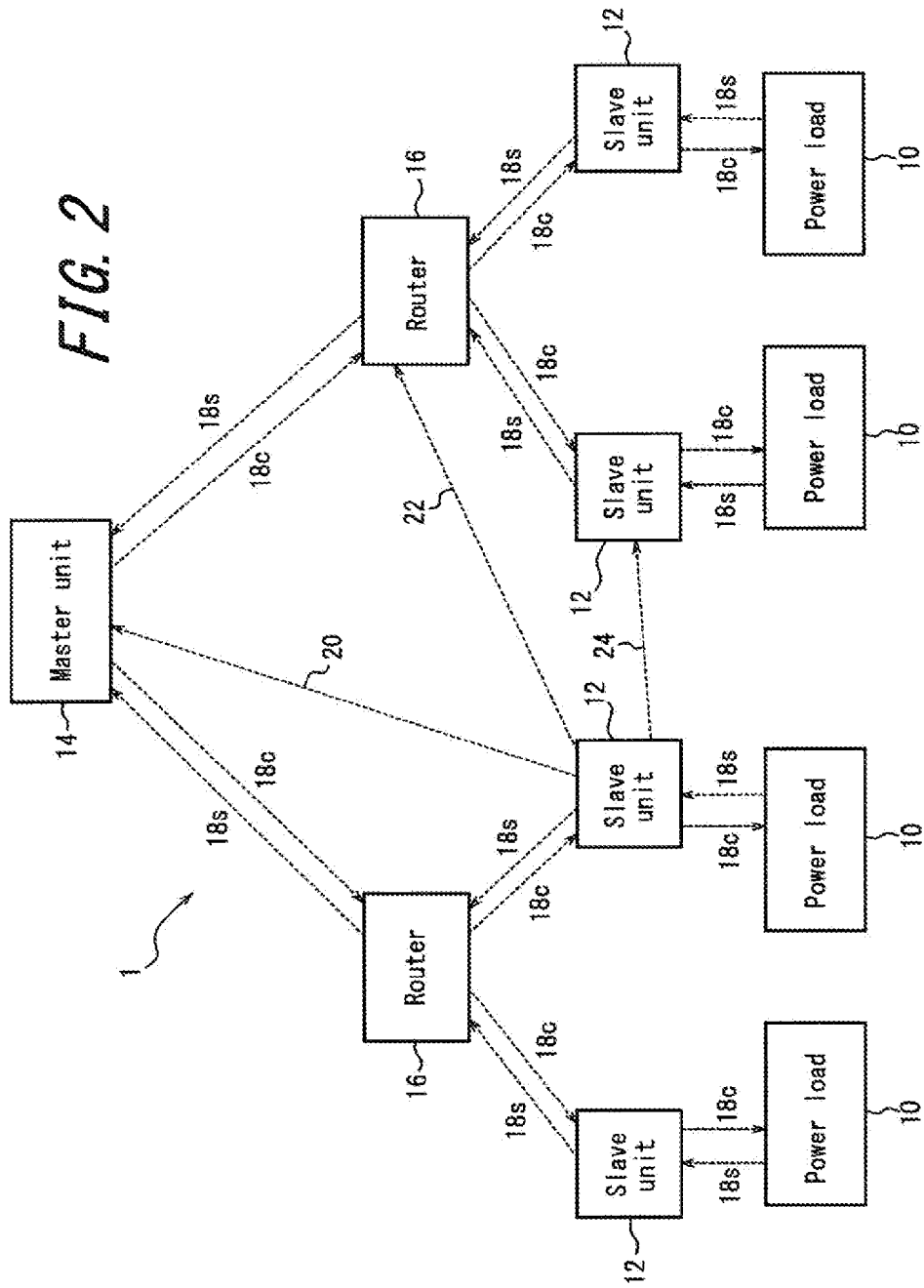
FIG. 2 is a diagram for illustrating an example of a network system 1.

Thereby, for example, as illustrated in FIG. 2, the slave unit 12 can transmit the data of electrical quantity directly to the master unit 14 without using the router 16 (route 20). Therefore, the data can be transmitted with a less number of hops, and thus the wireless occupancy in the overall network is decreased, which leads to less chance of packet collisions. Also, the data of electrical quantity can be transmitted from the slave unit 12 to the master unit 14 through a routing different from a predetermined one. For example, when loads are concentrated on a predetermined router 16, the data of electrical quantity can be transmitted through another router 16 located close thereto (route 22), or through the other slave unit (route 24). Thus, transmission through a plurality of routes increases redundancy, and the data of electrical quantity can be reliably transmitted to the master unit 14. In addition, at that time, the slave unit 12 transmits through broadcast by increasing a transmission power in a phased manner, thereby allowing more reliable transmission of the data of electrical quantity to the master unit 14.

Note that, in the case of broadcasting operation, when the slave unit 12 or the router 16 receives the data of electrical quantity transmitted from the other slave unit 12 or the router 16, the slave unit 12 or the router 16 retransmits it. Thus, as a whole network system 1, the communication load increases and congestion may occur. For detailed example, increase in a transmission power may increase the possibility of congestion. Therefore, in the present embodiment, when a predetermined period of time has elapsed after start of operation through broadcast, the slave unit 12 changes the transmission mode to a transmission mode in which a network load is decreased, for example, a mode in which transmission is performed through unicast or multicast at a frequency lower than that through broadcast. In addition, the slave unit 12 decreases a transmission power. In this manner, the data of electrical quantity can be reliably transmitted to the master unit 14 without reducing the effect due to an increase in redundancy of a transmission route through broadcast.

Figure 3:
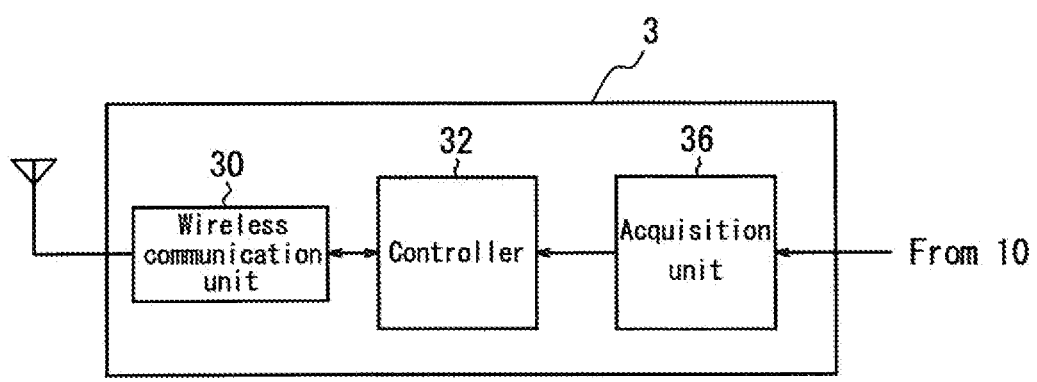
FIG. 3 is a diagram illustrating a configuration example of the communication device.

FIG. 3 illustrates a configuration example of a communication device included in the slave unit 12. The communication device 3 includes an acquisition unit 36 configured to acquire the data of electrical quantity of a power load 10 from a current sensor or a power sensor, a wireless communication unit 30 configured to perform a wireless transmission/reception of a packet that includes the data of electrical quantity, and a controller 32 configured to perform various control operations and determine a transmission mode of the wireless communication unit 30 as well.

The acquisition unit 36 includes, for example, in the case of the power sensor outputting the data of electrical quantity of analog signal, an AD converter for converting the data into AD, or, in the case the power sensor outputting the data of electrical quantity of digital signal, a digital input interface for taking the data.

The controller 32 receives the data of electrical quantity acquired by the acquisition unit 36 and delivers it to the wireless communication unit 30. Then, the controller 32 acquires a packet from the other slave unit 12 or router 16 received by the wireless communication unit 30. Then, the controller 32 inputs, for example, based on the head data of the packet, a control signal that controls the operation of the wireless communication unit 30 and the data of electrical quantity to be transmitted, into the wireless communication unit 30. For example, when a packet transmitted through broadcast is received, the controller 32 causes the wireless communication device 30 to retransmit the data of electrical quantity included in the packet through broadcast. In addition, when a packet transmitted through unicast or multicast is received, if ACK signal for confirming a reception is requested, the controller 32 causes the wireless communication device 30 to transmit ACK signal. Also, the controller 32 determines a transmission mode of the wireless communication unit 30 based on the acquired data of electrical quantity, and transmits a signal indicating the determined transmission mode to the wireless communication unit 30. Determination of a transmission mode will be described in detail later. The controller 32 includes, for example, a DSP (Digital Signal Processor) or ASIC (Application Specific Integrated Circuit) in which a corresponding control operation is implemented.

Next, examples of the operation of the communication device according to the present embodiment will be described.

First Example

FIGS. 4A and 4B are diagrams illustrating an operation of a communication device according to a first example. In FIG. 4A, the vertical axis corresponds to the electrical quantity of each power load 10 acquired by each slave unit 12 and transmission modes M1 to M4 of the wireless communication unit 20 and the horizontal axis corresponds to the time. Then, FIG. 4A illustrates the transition of the electrical quantity 40 and the change in the transmission mode 42.

Here, the transmission mode M1 is a transmission mode of broadcast. Then, in the transmission mode M2, transmission frequency is lower than that in the transmission mode M1 (e.g. at every few seconds in the transmission mode M1, and at dozen seconds in the transmission mode M2), and transmission is performed through multicast/unicast with ACK that requests ACK. In addition, in the transmission mode M3, transmission frequency is lower than that in the transmission mode M1, and transmission is performed through multicast/unicast without ACK that does not request ACK. Then, the transmission mode M4 corresponds to a normal transmission mode. In the transmission mode M4, a packet is transmitted based on the route that is set in the routing table in which the packet reaches the master unit 14 through the router 16 or the other communication device 3, through unicast, that is, by specifying a destination. In addition, in the transmission mode M4, a packet is transmitted at a frequency even lower than that in the transmission mode M2 or M3 (e.g. every dozen seconds to few minutes).

In FIG. 4B, the vertical axis corresponds to the transmission powers P1 to P3 of each slave unit 12 and the horizontal axis corresponds to the time. Then, FIG. 4B shows a change in the transmission power 44. Here, the transmission powers are ordered from the largest P1 to the smallest P3.

For example, when the wireless communication unit 30 operates in the transmission mode M4 (a normal transmission mode) in which the data of electrical quantity is wirelessly transmitted to the master unit 14 periodically by specifying a destination and with a transmission power P3, if the data of electrical quantity greater than the reference value val 1 is acquired, the controller 32 switches to transmission mode M1 in which a packet including the data of electrical quantity is wirelessly transmitted through broadcast without specifying a destination (time T1). Thereby, the data can be transmitted with a less number of hops, and the wireless occupancy in the overall network is decreased, which leads to less chance of packet collisions. In addition, transmission through a plurality of routes may increase redundancy. Furthermore, the slave unit 12 switches to the transmission mode M1 and increases the transmission power to the transmission power P2, then after elapse of a predetermined period of time (any period of time set previously), increases to the transmission power P1 as well. Thus the data of electrical quantity can be transmitted more reliably to the master unit 14.

Also, for example, the controller 32 switches, when a predetermined period of time has elapsed during operation of the wireless communication unit 30 in the transmission mode M1 (broadcast), to the transmission mode M2 in which transmission is performed through multicast or unicast at a transmission frequency equal to or smaller than that in the transmission mode M1 (time T2). Thus, even if the communication load of the overall network temporarily increases due to broadcast, this can be decreased rapidly. In addition, the slave unit 12 switches to the transmission mode M2 and decreases the transmission power to the transmission power P3 as well, which decreases the possibility of causing congestion, and the data of electrical quantity can be transmitted to master unit 14 reliably. The predetermined period of time used for such judgment is set previously, by experiment or simulation, for example, to any period of time (e.g. for several tens of seconds to several minutes) in which an increase in load may occur in the overall network due to broadcast.

Also, for example, when the electrical quantity greater than the reference value val 1 is acquired during operation of the wireless communication unit 30 in the transmission mode M2, the controller 32 switches again to the transmission mode M1 in which the data of electrical quantity is wirelessly transmitted through broadcast (time T3). Along with that, the transmission power is switched from P3 to P2. Then, after elapse of a predetermined period of time, the controller 32 increases the transmission power to P1. Thus, the chance to transmit the data of electrical quantity to the master unit 14 can be secured more reliably.

Also, for example, even if the data of electrical quantity greater than the reference value val 1 is acquired, when a packet transmitted through broadcast by itself reaches the communication device 3 of the master unit 14, for example, and return of the packet transmitted by itself from the master unit 14 is judged from the header of the packet, the controller 32 switches the operation of the wireless communication unit 30 from the transmission mode M1 (broadcast) to the transmission mode M3 in which the packet is transmitted through multicast or unicast (time T4). Then, along with that, the transmission power is switched from P1 to P3. Thus, without continuing a state of increased communication load needlessly in the overall network, the data of electrical quantity can be transmitted reliably to the master unit 14. Note that, when comparing with the transmission mode M2 of multicast/unicast with ACK, in the transmission mode M3 of multicast/unicast without ACK, a return communication for ACK is not needed, thus the network load can be reduced further. Along with that, generation of a waiting state for retransmission process in the case where ACK is not received can be prevented. For example, when the time needed for time out for retransmission is set to a few seconds to dozen seconds, such waiting time can be omitted.

Then, for example, when the data of electrical quantity smaller than the reference value val 3 (<val 1) is acquired, the controller 32 switches the operation of the wireless communication unit 30 to the transmission mode M4 (a normal transmission mode) (time T5).

Next, a method of determination of transmission mode and determination of transmission power by the communication device 3 will be described in more detail. For example, the controller 32 determines the transmission mode by using a table data in which the electrical quantity and the time for determining the transmission mode is associated with the transmission mode. Hereinafter the table is referred to as a transmission mode table. In addition, the controller 32 determines the transmission power by using a table data in which the electrical quantity and the time for determining the transmission mode is associated with the transmission power. Hereinafter the table is referred to as a transmission power table.

FIGS. 5A and 5B illustrate an example of a transmission mode table. In the transmission mode tables TBL1 (FIG. 5A) and TBL3 (FIG. 5B), the vertical axes represent the electrical quantity and the horizontal axes represent the time. In the process procedure for determining the transmission mode described later, as a parameter for referring the transmission mode tables TBL 1 and TBL3, the levels L1 to L4 corresponding to the electrical quantity in the vertical direction and the transmission count CNT corresponding to the time in the horizontal direction are determined. For example, level L1, level L2, level L3 and level L4 correspond respectively to the electrical quantity greater than the reference value val 1, the electrical quantity equal to or smaller than the reference value val 1 and greater than the reference value val 2, the electrical quantity equal to or smaller than the reference value val 2 and greater than the reference value val 3 and the electrical quantity equal to or smaller than the reference value val 3.

In the transmission mode table TBL1, the transmission modes M1 to M4 are mapped. In addition, in the transmission mode table TBL3, the transmission modes M3 and M4 are mapped. The blanks in the table show no transmission operation performed. Such transmission mode tables TBL1 and TBL3 are stored previously, for example, in the memory in the controller 32.

On the other hand, FIGS. 5C and 5D illustrate respectively an example of a transmission power table. In the transmission power tables P_TBL1 (FIG. 5C) and P_TBL3 (FIG. 5D), the vertical axis represents the electrical quantity and the horizontal axis represents the time. In the process procedure for determining the transmission power described later, as a parameter for referring the transmission power tables P_TBL1 and P_TBL3, as in the case of the transmission mode table, the levels L1 to L4 corresponding to the electrical quantity in the vertical axis direction and the transmission count CNT corresponding to the time in the horizontal axis direction are used.

The transmission power table P_TBL1 is used when the transmission mode table TBL1 is used. In the transmission power table P_TBL1, transmission powers P1 to P3 are mapped. In addition, the transmission power table P_TBL3 is used when the transmission mode table TBL3 is used. In the transmission power table P_TBL3, the transmission power P3 is mapped. The blanks in the table show no transmission operation performed. Such transmission power tables P_TBL1 and P_TBL3 are stored, for example, in the memory in the controller 32.

Figure 6:
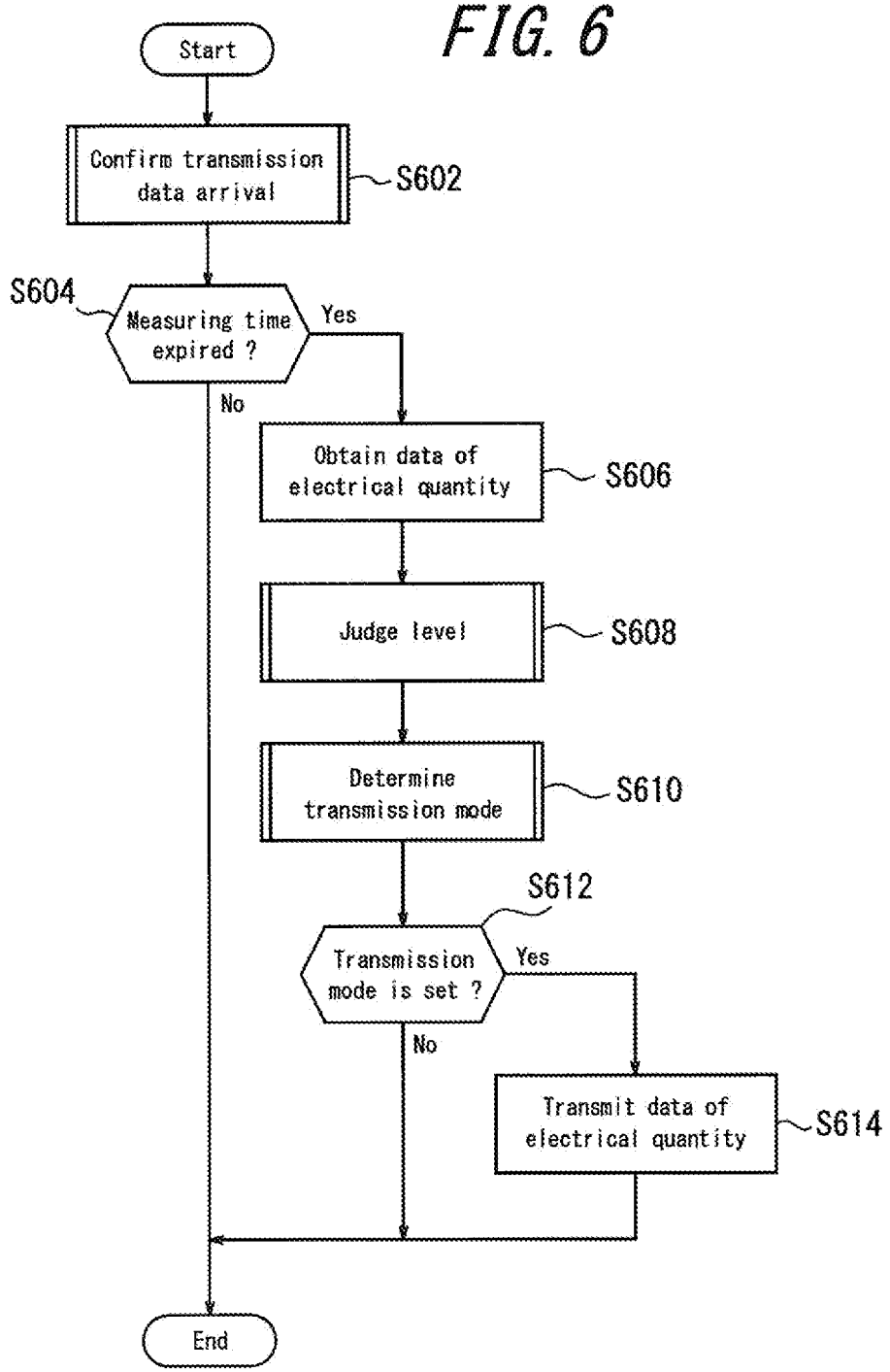
FIG. 6 is a flowchart diagram illustrating an operation procedure of the communication device 3 according to the first example.

FIG. 6 is a flowchart diagram illustrating an operation procedure of the communication device 3 in the first example. This procedure is performed during operation of the communication device 3.

In the communication device 3, the controller 32 performs a transmission data arrival confirmation process to confirm whether or not the transmitted data reaches the destination (S602). After that, the controller 32 judges whether or not the measuring timer that is set for periodically collecting the data from the power sensor is expired (S604). Then, when judging that the measuring timer is not expired (No in S604), the controller 32 repeats this process procedure. When judging that the measuring timer is expired (Yes in S604), the controller 32 acquires the data of electrical quantity from the power sensor through the acquisition unit 36 (S606) and performs a level judgment process for judging the level of the acquired data of electrical quantity (S608).

Next, the controller 32 performs a transmission mode determination process for setting the transmission mode in the transmission method determination process described later (S610). Then, the controller 32 judges whether or not any of the transmission modes from M1 to M4 is set for the wireless communication unit 30 (S612), and if the transmission mode is set (Yes in S612), causes the wireless communication unit 30 to transmit the data in the transmission mode that is set (S614). On the other had, if the transmission mode is not set (No in S612), this process procedure ends.

Figure 7:
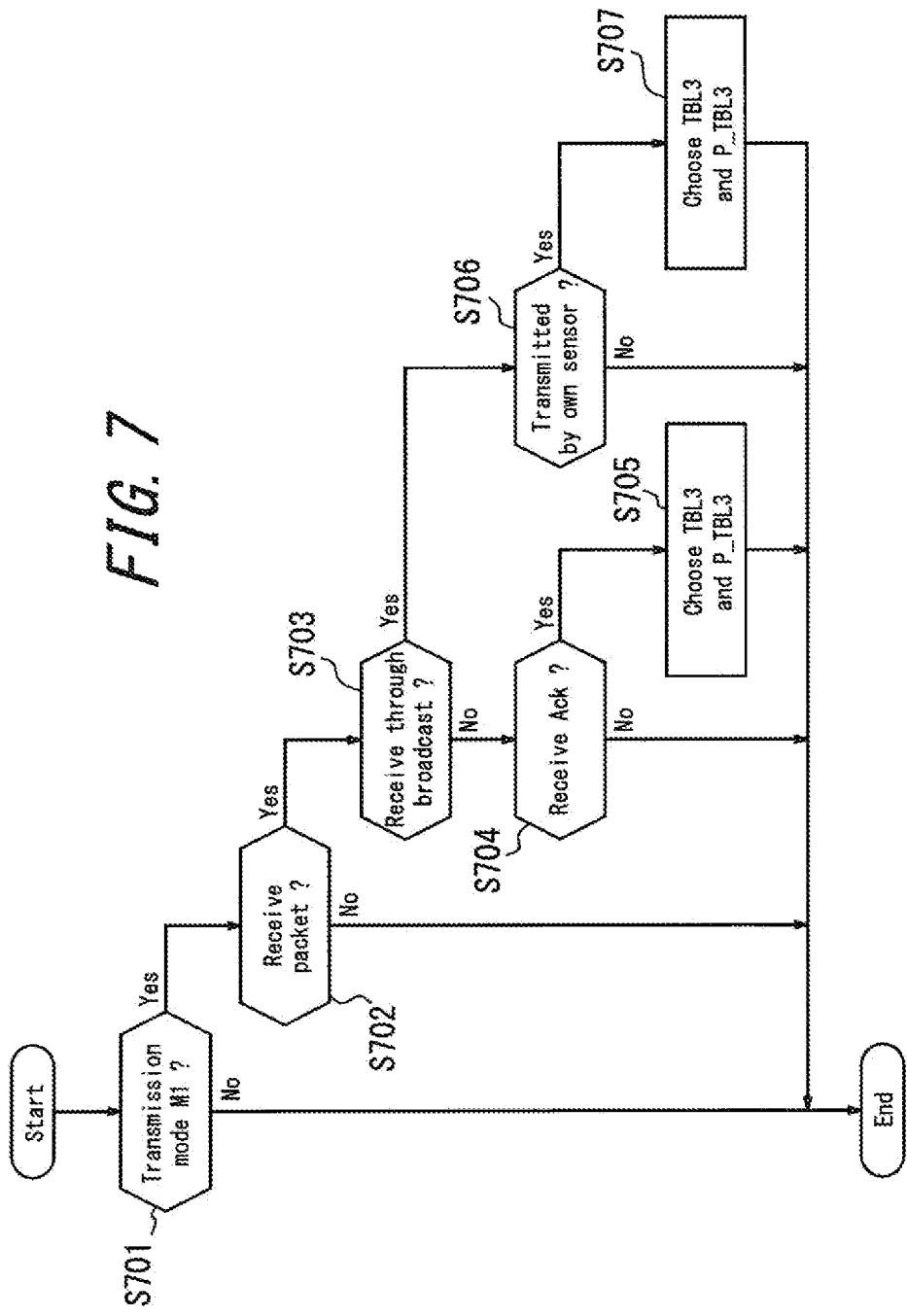
FIG. 7 is a flowchart diagram for illustrating a detailed procedure example of a transmission data arrival confirmation process.

FIG. 7 is a flowchart diagram for illustrating a detailed procedure of the transmission data arrival confirmation process. The procedure in FIG. 7 corresponds to the subroutine of S602 in FIG. 6, and is a process procedure for switching the transmission mode table used for determining the transmission mode. The procedure in FIG. 7 is performed in the default state where the transmission mode table TBL1 and the transmission power table P_TBL1 are set.

The controller 32 judges whether or not the transmission mode that is set is the transmission mode M1 (broadcast) (S701), and if it is the transmission mode M1 (Yes in S701), judges whether or not a packet from the other communication device 3 is received (S702). When judging that the packet is received (Yes in S702), the controller 32 judges whether or not the packet is received through broadcast (S703). For example, the controller 32 reads out the sequence number by which the number of hops of broadcast and a packet transmitted through broadcast are identified from the header of network layer, and based thereon, judges whether or not the packet transmitted through broadcast is received. On the other hand, when judging that the packet transmitted through broadcast is not received (No in S703), the controller 32 judges whether or not the received packet is ACK transmitted from the other communication device 3 to its own communication device (S704).

When judging that the ACK transmitted to itself is received (Yes in S704), since the packet reaches the destination, the controller 32 switches immediately to the transmission mode in which a load to the network is reduced. For detailed example, the controller 32 changes from the transmission mode table TBL1 and the transmission power table P_TBL1 to TBL3 and P_TBL3 (S705).

In addition, when judging that a packet transmitted through broadcast is received (Yes in S703), the controller 32 judges whether or not the packet is a broadcast packet transmitted by itself (S706). For example, the controller 32 judges whether or not the sender address located in the header of MAC layer matches the destination address (for example, the address of the coordinator unit of the master unit 14) and the Sequence No. located in the header of the network layer matches the Sequence No. of the broadcast packet transmitted by itself, and when they match, the controller 32 can confirm that the broadcast packet transmitted by itself is received and relayed by the destination (note that the method of judging whether or not the packet transmitted by itself is transmitted is called "passive ACK"). Thus, when judging that the packet is the broadcast packet transmitted by itself (Yes in S706), the controller 32 changes, as in the case of the procedure S705, from the transmission mode table TBL1 and the transmission power table P_TBL1 to TBL3 and P_TBL3 (S707).

Moreover, in the case where the mode is not the transmission mode M1 (No in S701), a packet is not received from the other communication device 3 (No in S702), it is judged that the own ACK is not received (No in S704), and it is judged that the packet is not the broadcast packet transmitted by itself (No in S706), the controller 32 ends the process without changing the transmission mode table and the transmission power table chosen before performing this flow.

With the above mentioned procedure, the transmission mode table and the transmission power table are kept respectively to TBL 1 and P_TBL1, or are changed respectively to TBL3 and P_TBL3. When the transmission mode table TBL1 is kept, as illustrated in FIG. 5A, as long as the electrical quantity is large (e.g. level L1) and the elapsed time is short (transmission count CNT=1 to 2), the transmission mode M1 for broadcast is chosen. At this time, since the transmission power table P_TBL1 is kept, as illustrated in FIG. 5C, as the time passes from CNT=1 to CNT=2, the transmission power increases from P2 to P1. Then, when the electrical quantity decreases or the elapsed time increases, as illustrated in FIG. 5A, the transmission modes M2 to M4 are chosen. At this time, as the transmission power, P3 is chosen as illustrated in FIG. 5C.

On the other hand, when the table is switched to the transmission mode table TBL3, as illustrated in FIG. 5B, the transmission mode M1 of broadcast is not chosen, and the transmission mode M3 of multicast/unicast without ACK or the normal transmission mode M4 is chosen. At this time, as the transmission power, P3 is chosen as illustrated in FIG. 5D. Thus, the transmission mode table and the transmission power table are changed according to the procedure in FIG. 7, and even if the data of electrical quantity greater than the reference value val 1 is acquired, when the packet broadcasted by itself reaches the communication device 3 of the other slave unit 12, the mode can be switched to the mode in which a packet is transmitted through multicast or unicast. Thus, without continuing a state of increased communication load needlessly in the overall network, the data of electrical quantity can be transmitted reliably to the master unit 14.

Figure 8:
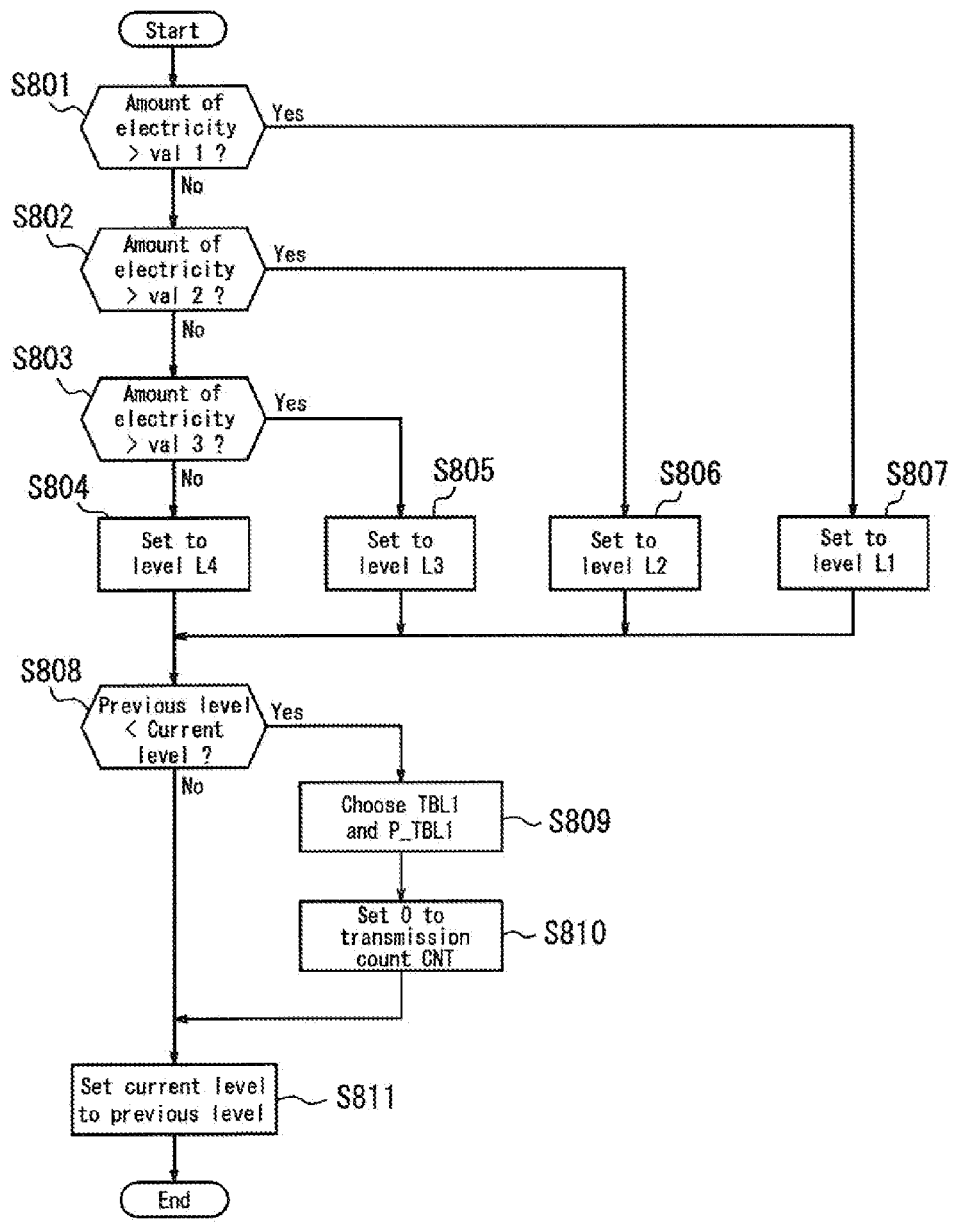
FIG. 8 is a flowchart diagram for illustrating a detailed procedure example of a level judgment process.

FIG. 8 is a flowchart diagram for illustrating a detailed procedure example of a level judgment process. The procedure in FIG. 8 corresponds to the subroutine of the procedure S608 in FIG. 6.

The controller 32 judges whether or not the acquired data of electrical quantity exceeds the reference value val 1 (S801), and when judging that the data exceeds val 1 (Yes in S801), it sets the level for referring the transmission mode table to L1 (S807). On the other hand, when judging that the acquired data of electrical quantity does not exceed val 1 (no in S801), the controller 32 judges whether or not the acquired data of electrical quantity exceeds the reference value val 2 (S802), and when judging that the data exceeds val 2 (Yes in S802), it sets the level to L2 (S806). Furthermore, when judging that the acquired data of electrical quantity does not exceed val 2 (No in S802), the controller 32 judges whether or not the acquired data of electrical quantity exceeds val 3 (S803), and when judging that it exceeds val 3 (Yes in S803), it sets the level to L3 (S805). Then, when judging that the acquired data of electrical quantity does not exceed val 3 (No in S803), the controller 32 sets the level to L4 (S804).

The controller 32 sets the level, and compares the level for the previous process and the level determined for the present process (S808). Then, if the level is higher than the previous one (Yes in S808), the controller 32 chooses TBL1 and P_TBL1 (S809), and sets the transmission count to CNT=0 (S810). Then the controller 32 stores the level that is set for the present process in the variable or the register that stores the previous level (S811). If the level is lower than the previous one (No in S808), the controller 32 does not change the transmission mode table and stores the level that is set this time in the variable or the register that stores the previous level (S811).

Figure 9:
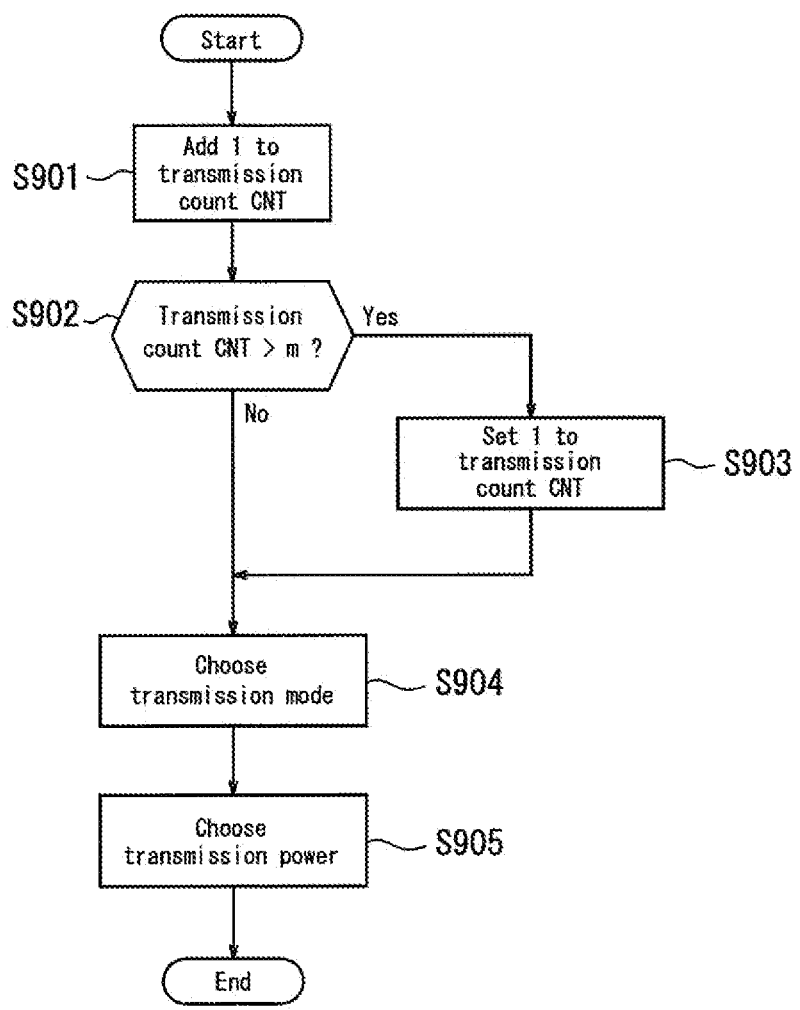
FIG. 9 is a flowchart diagram for illustrating a detailed procedure example of a transmission mode determination process.

FIG. 9 is a flowchart diagram for illustrating a detailed procedure of the transmission mode determination process. The procedure of FIG. 9 corresponds to the subroutine of S610 in FIG. 6.

The controller 32 adds "1" to the transmission count CNT (S901), and judges whether or not the transmission count CNT exceeds the number of columns m of the transmission mode table (S902). Then when judging that the CNT exceeds the number of columns m (Yes in S902), the controller 32 sets "1" for the transmission count CNT (S903).

When determining the transmission count CNT, as mentioned above, the controller 32 chooses the transmission mode that corresponds to the level and the transmission count CNT determined in the transmission mode table chosen (S904). Then, the controller 32 chooses the transmission power in the transmission power table chosen (S905).

According to the above mentioned procedure, the transmission mode is determined from the transmission mode table that is chosen based on the levels L1 to L4 that correspond to the electrical quantity and the time (transmission count CNT). Furthermore, along with that, the transmission power is determined from the transmission power table that chosen. Then, the following effect is obtained. For example, during operation in the transmission mode M4 (a normal transmission mode), by switching the mode to the transmission mode M1 (broadcast) when the electrical quantity greater than the reference value val 1 is acquired, data can be transmitted with a less number of hops, and the wireless occupancy in the overall network is decreased, which leads to less chance of packet collisions. In addition, transmission through a plurality of routes can increase redundancy. Also, increase in the transmission power with time allows more reliable transmission of the data of electrical quantity to the master unit 14.

Moreover, by switching to the transmission mode M2 in which transmission is performed through multicast or unicast when a predetermined period of time has elapsed during operation in the transmission mode M1 (broadcast), even if the communication load of the overall network temporarily increases due to broadcast, this increase can be decreased rapidly. Furthermore, when a packet wirelessly transmitted through broadcast by the communication device 3 of the other slave unit 12 is received, the transmission mode is switched from the transmission mode M1 (broadcast) to the transmission mode M3 in which transmission is performed through multicast or unicast, which allows transmission of the data of electrical quantity reliably to the master unit 14 without continuing a state of increased communication load needlessly in the overall network. Also, in the transmission mode M3, a return communication for ACK is not needed, which allows further reduction in the network load. Along with that, generation of a waiting state for retransmission process in the case where ACK is not received can be prevented.

Second Example

In the second example, in addition to the control in the first example, the controller 32 reduces the reference value for choosing the transmission mode through broadcast when a packet wirelessly transmitted by the other communication device through broadcast is received. When the other communication device transmits through broadcast, it is highly probable that the electrical quantity consumed by the overall power load 10 increases, and in such a case, it is desirable that the data of electrical quantity is delivered to the master unit 14 sooner. Therefore, reduction in the reference value to switch to the broadcast allows transition to the broadcast sooner. Then, control of electrical quantity to be consumed is achieved before the electrical quantity of the overall power load 10 exceeds the allowable amount.

Figures 10A, 10B:
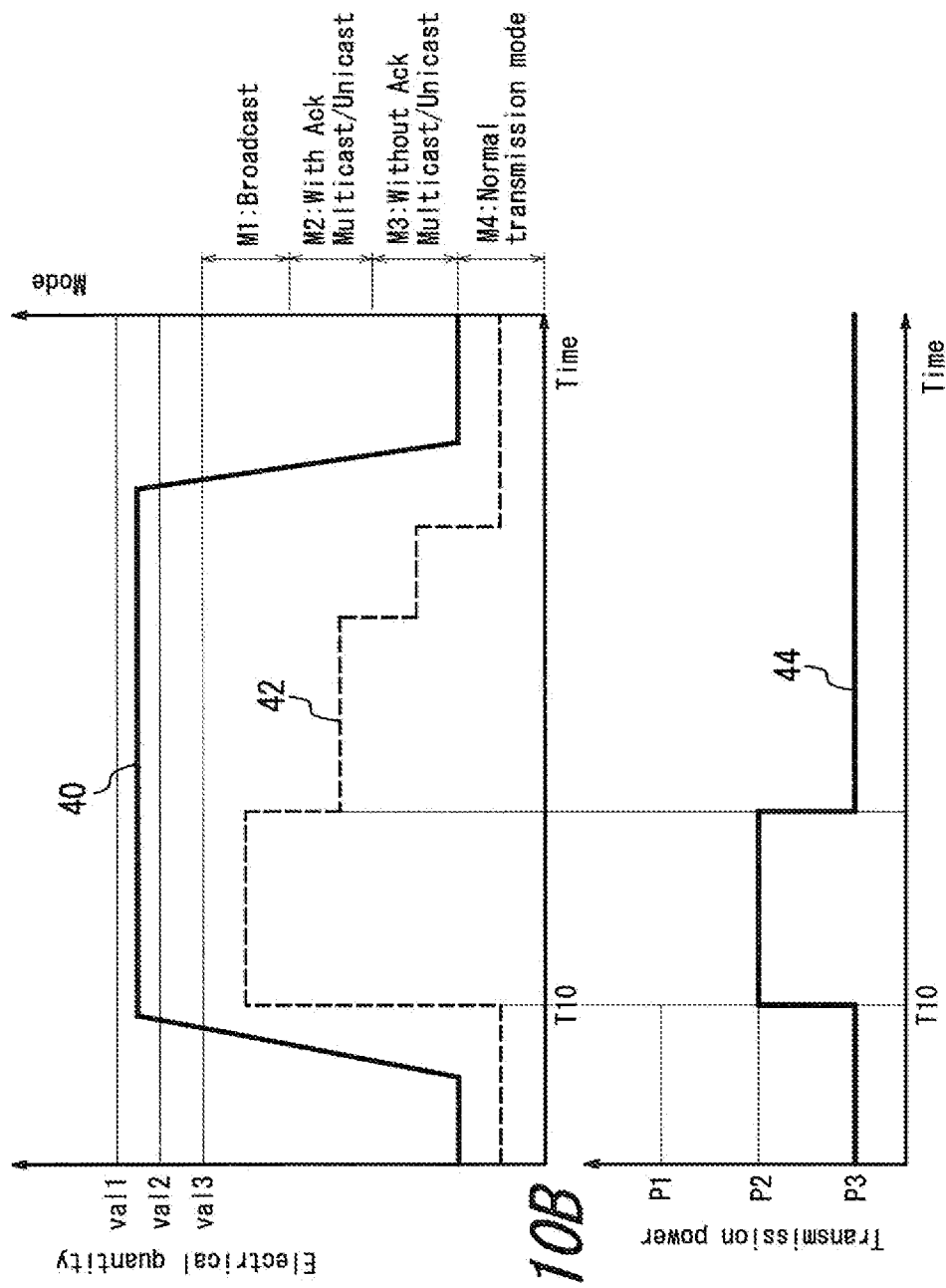
FIGS. 10A and 10B are diagrams for illustrating respectively a second example.

FIGS. 10A and 10B are diagrams for illustrating a second example. In FIG. 10A, as in the case of FIG. 4A, the vertical axis corresponds to the electrical quantity of each power load 10 acquired by each slave unit 12 and the transmission modes M1 to M4 of the wireless communication unit 20 and the horizontal axis corresponds to the time. Then, the figure illustrates the transition of the electrical quantity 40 and the change in the transmission mode 42. In addition, in FIG. 10B, as in the case of FIG. 4B, the vertical axis corresponds to the transmission powers P1 to P3 of each slave unit 12 and the horizontal axis corresponds to the time. Then the figure illustrates the change in the transmission power 44.

For example, when the wireless communication unit 30 operates in the transmission mode M4 (a normal transmission mode) in which the data of electrical quantity is wirelessly transmitted to the master unit 14 periodically through a predetermined route by specifying a destination and with the transmission power P3, if a packet wirelessly transmitted from the other communication device 3 through broadcast is received, the controller 32 switches to the transmission mode M1 in which the data of electrical quantity is wirelessly transmitted through broadcast when the electrical quantity exceeds val 2 which is smaller than the reference value val 1 (time T10). At this time, the transmission power is switched to P2.

In more detail, when the transmission mode and the transmission power are determined, the transmission mode table TBL2 and the transmission power table P_TBL2 as illustrated in FIGS. 11A and 11B are used. In FIGS. 11A and 11B, as in the case of FIGS. 5A and 5C, in the transmission mode table TBL2 and the transmission power table P_TBL2, the vertical axes represent the electrical quantity and the horizontal axes represents the time. In the transmission mode table TBL2, when comparing with the transmission mode table TBL1 in FIG. 5A, the transmission mode of broadcast M1 is associated with the lower level. For example, in the transmission mode table TBL1, the transmission mode M1 is associated only with level L1 that corresponds to the electrical quantity larger than the reference value val 1, whereas in the transmission mode table TBL2, the transmission mode M1 is also associated with the level L2 that corresponds to the electrical quantity larger than the reference value val 2. By using such transmission mode table TBL2, the reference value for choosing the transmission mode M1 can be reduced. Note that, in the transmission power table P_TBL2, the level of electrical quantity and the time are associated with the transmission power such that the transmission power P2 and the transmission power P3 are chosen respectively for the transmission mode M1 and the transmission modes M2 to M4.

Figure 12:
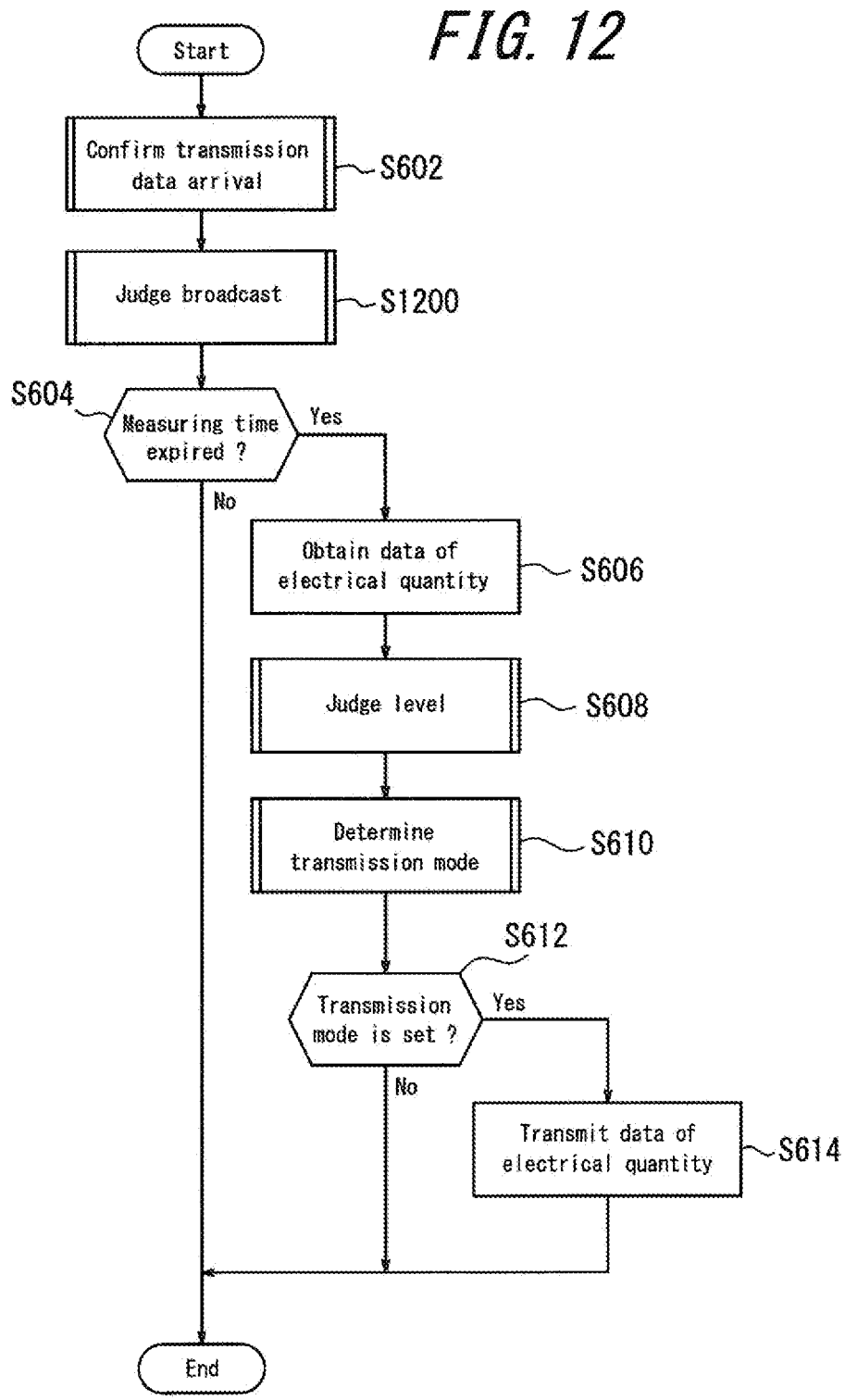
FIG. 12 is a flowchart diagram for illustrating an operation procedure of a communication device 3 in the second example.

FIG. 12 is a flowchart diagram for illustrating an operation procedure of the communication device 3 in the second example. The flowchart diagram in FIG. 12 is different from that in FIG. 6 in that a broadcast judgment process (S1200) for judging whether or not transmission through broadcast is performed by the other communication device 3 is inserted between the procedures S602 and S604 in the flowchart diagram in FIG. 6 of the first example. The description of the other procedures that are the same as those in FIG. 6 is omitted.

Figure 13:
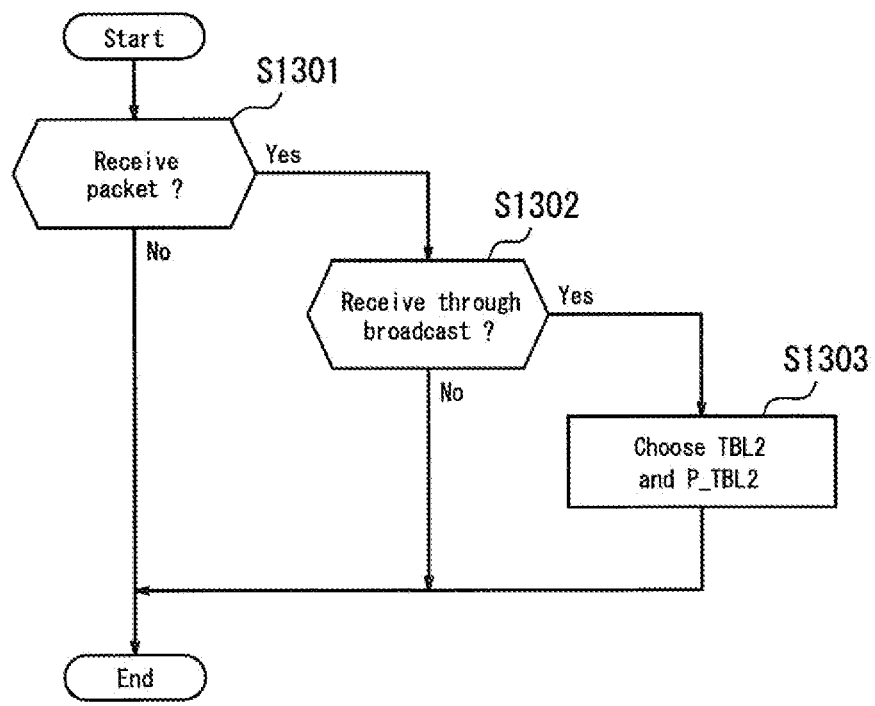
FIG. 13 is a flowchart diagram for illustrating a detailed procedure example of a broadcast judgment process S1200 in the second example.

FIG. 13 is a flowchart diagram for illustrating a detailed procedure of the broadcast judgment process S1200 in FIG. 12. The controller 32 judges whether or not a packet is received (S1301), and when judging that a packet is received in S1301 (Yes in S1301), judges whether or not the packet received is transmitted from the other slave unit 12 through broadcast (S1302). Then, when judging that the packet is received through broadcast in S1302 (Yes in S1302), the controller 32 changes the transmission mode table to TBL2 and the transmission power table to P_TBL2 (S1303).

Switching to the transmission mode table TBL2 following this procedure allows transition to broadcast sooner, and enables the electrical quantity to be controlled before the electrical quantity of the overall power load 10 exceeds the allowable amount. In addition, at this time, the transmission power is reduced instead of a transition to the broadcast sooner when the electrical quantity is low by using the transmission power table P_TBL2, thus a rapid increase in the load of the overall network can be prevented.

Third Example

In the third example, as an exceptional control of the control in the first example, when a packet wirelessly transmitted by the other communication device through broadcast is received, the controller 32 switches to the transmission mode M2 or M3 of multicast/unicast, not to the transmission mode M1 of broadcast. When the other communication device transmits through broadcast, it is highly probable that the electrical quantity of the overall power load 10 increases, and in such a case, it is desirable that the data of electrical quantity is delivered to the master unit 14 sooner. Therefore, in order to avoid an increase in a load of the overall system by choosing broadcast by itself, the controller chooses the transmission mode M2 or M3 of multicast/unicast.

Thus, for example, without continuing a state of increased communication load needlessly in the overall network, collision between broadcast packets on the network can be avoided. Therefore, the data of electrical quantity can be transmitted reliably to the master unit 14. Along with that, transmission is performed in the transmission mode M2 or M3 whose transmission frequency is higher than the transmission mode M4, thus the data of electrical quantity can be delivered to the master unit 14 more quickly.

Figure 14:
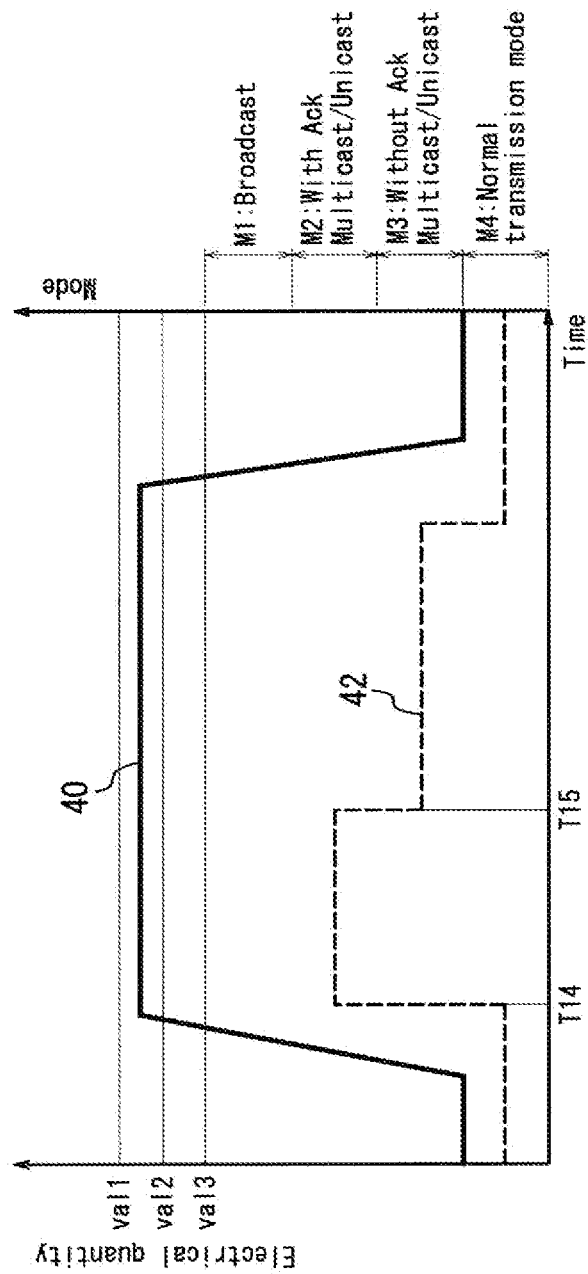
FIG. 14 is a diagram for illustrating a third example.

FIG. 14 is a diagram for illustrating the third example. In FIG. 14, as in the case of FIGS. 4A and 10A, the vertical axis corresponds to the electrical quantity of each power load 10 acquired by each slave unit 12 and the transmission modes M1 to M4 of the wireless communication unit 20 and the horizontal axis corresponds to the time. Then, the figure illustrates the transition of the electrical quantity 40 and the change in the transmission mode 42.

For example, when the wireless communication unit 30 operates in the transmission mode M4 (a normal transmission mode) in which the data of electrical quantity is wirelessly transmitted to the master unit 14 periodically through a predetermined route, if a packet wirelessly transmitted from the other communication device 3 through broadcast is received, the controller 32 switches to the transmission mode M2 in which the data of electrical quantity is wirelessly transmitted through multicast/unicast when the electrical quantity exceeds the reference value (in this case, val 2) (time T14). Note that, in a predetermined period of time after switching to the transmission mode M2, the controller 32 may switch to the transmission mode M3 (time T15). Note that, when the transmission mode is M2 to M4, the transmission power is constant at P3 (FIGS. 4B and 10B), which is not illustrated in FIG. 14.

Figure 15:
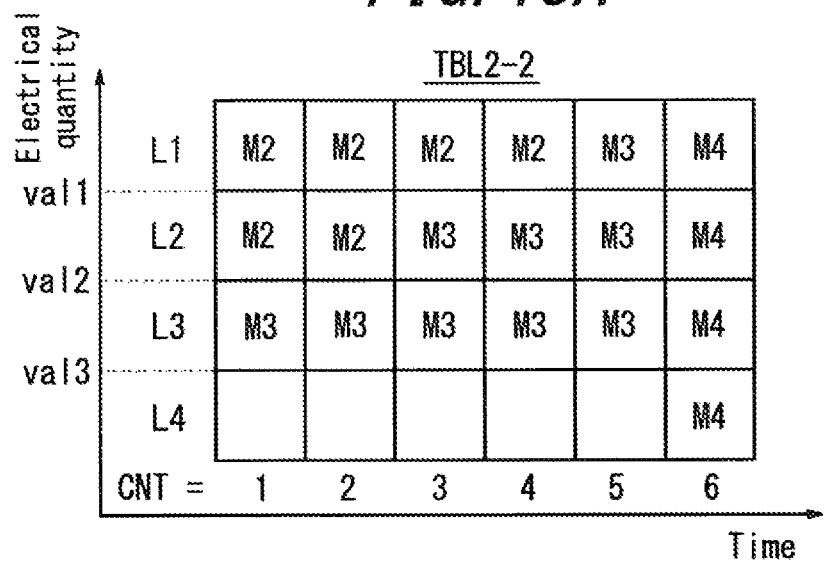
FIGS. 15A and 15B are diagrams illustrating respectively an example of a transmission mode table in the third example.

In more detail, when the transmission mode is determined, the transmission mode table TBL2-2 as illustrated in FIG. 15A is used. In FIG. 15, as in the case of FIGS. 5A and 11A, in the transmission mode table TBL2-2, the vertical axis represents the electrical quantity and the horizontal axis represents the time. In the transmission mode table TBL2-2, when comparing with the transmission mode table TBL1 in FIG. 5 where the transmission mode of broadcast M1 is associated with the level L1 and the transmission count CNT=1, 2, the transmission mode M2 is associated therewith. With the transmission mode table TBL2-2, the transmission mode M1 is not chosen and the transmission mode M2 is chosen. Note that when the transmission mode table TBL2-2 is used, the transmission power table P_TBL2-2 illustrated in FIG. 15B is used. In the transmission power table P_TBL2-2, the transmission power P3 is chosen when the transmission modes M2 to M4 are chosen.

The third example is performed in the same operation procedure as that for the second example illustrated in FIGS. 9 and 12. Then, the subroutine of the broadcast judgment process S1200 of the procedure in FIG. 12 is different.

Figure 16:
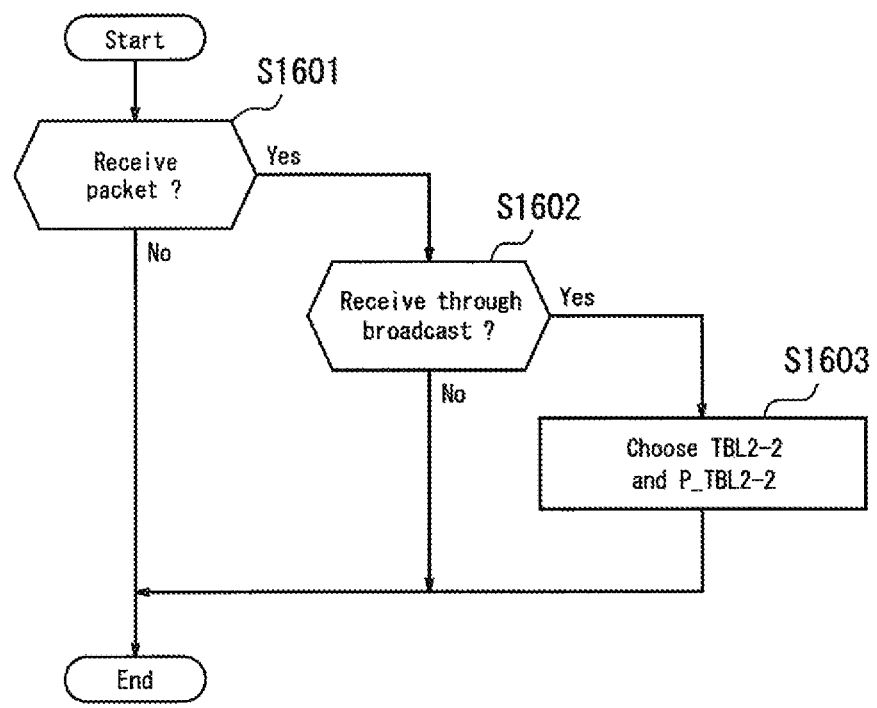
FIG. 16 is a flowchart diagram for illustrating a detailed procedure example of a broadcast judgment process in the third example.

FIG. 16 is a flowchart diagram for illustrating a detailed procedure of broadcast judgment process in the third example. FIG. 16 corresponds to the subroutine of the broadcast judgment process S1200 in FIG. 12. The controller 32 judges whether or not a packet is received (S1601), and when judging that a packet is received in S1601 (Yes in S1601), it judges that whether or not the received packet is a broadcast packet transmitted from the other slave unit 12 (S1602). Then, when judging that the broadcast packet is received in S1602 (Yes in S1602), the controller 32 changes the transmission mode table to TBL2-2 and the transmission power table to P_TBL2-2 (S1603).

Switching to the transmission mode table TBL2-2 and transmission power table P_TBL2-2 following this procedure allows transition to a mode in which the electrical quantity is transmitted to the master unit 14 sooner and reliably, and enables the electrical quantity to be controlled before the electrical quantity of the overall power load 10 exceeds the allowable amount.

Fourth Example

Figure 17:
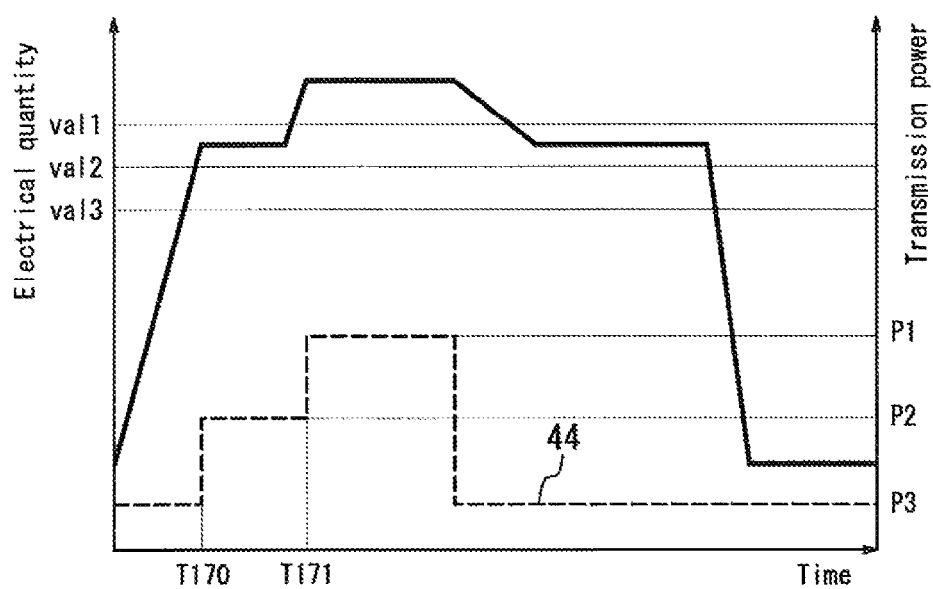
FIG. 17 is a diagram for illustrating a fourth example.
Figure 18:
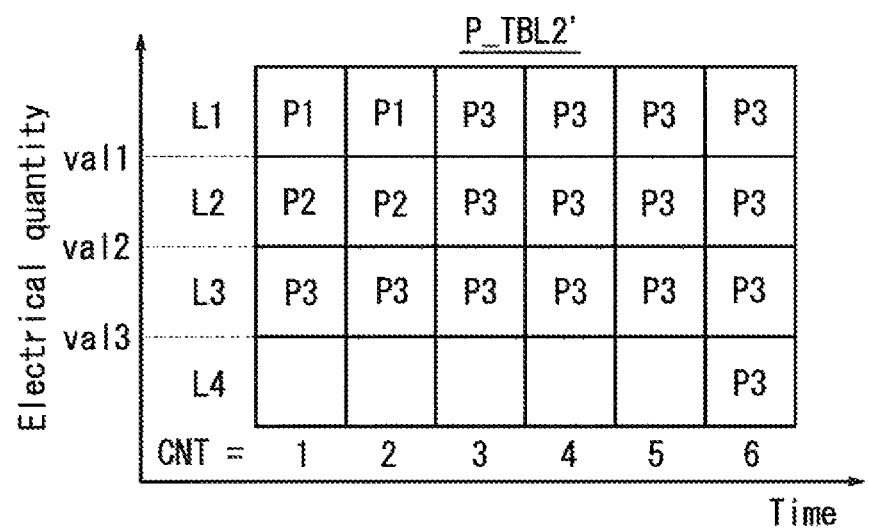
FIG. 18 is a diagram illustrating an example of a transmission power table used in the fourth example.

FIG. 17 is a flowchart diagram for illustrating a fourth example. In FIG. 17, as in the case of FIG. 10B, the vertical axis corresponds to the transmission powers P1 to P3 of each slave unit 12 and the horizontal axis corresponds to the time. Then, the figure illustrates the change in the transmission power 44. In addition, FIG. 18 illustrates an example of the transmission power table used in the fourth example.

The fourth example is an variation of the second example. In the second example, the controller 32 reduces, when the other communication device wirelessly transmits through broadcast, the reference value for choosing the transmission mode of broadcast and transits to the broadcast sooner, and on the other hand, the controller 32 reduces the transmission power by using the transmission power table P_TBL2, thus a sudden increase in the load of the overall network can be prevented. Whereas in the fourth example, as illustrated in FIG. 17, in the case where the mode is transited to broadcast and the transmission power is increased from P3 to P2 (time T170), if the electrical quantity increases and exceeds the reference value val 1 (time T171), the controller 32 increases the transmission power from P2 to P1. In more detail, by using the transmission power table P_TBL2' as illustrated in FIG. 18 instead of the transmission power table P_TBL2 used in the second example, for example, the transmission power can be increased when the electrical quantity is increased.

If the data of electrical quantity does not reach the master unit 14 due to reduction in the transmission power when the mode is transited to broadcast sooner with a low reference value, according to the fourth example, the transmission power is increased for broadcast transmission when the electrical quantity increases, thus the data of electrical quantity can be delivered reliably to the master unit 14.

Although the present invention has been described by way of examples with reference to the accompanying drawings, it is to be noted that various changes and modifications will be made easily by those skilled in the art based on the disclosure. Therefore, such changes and modifications are to be understood as included within the scope of the present invention. For example, the functions or the like included in the members, units, steps, or the like may be reordered in any logically consistent way. Further, units, steps, or the like may be combined into one or divided.

As mentioned above, according to the present embodiment, the data of electrical quantity can be reliably transmitted to the master unit. Thus, the electrical quantity can be controlled before the electrical quantity of the overall power load 10 exceeds the allowable amount.

REFERENCE SIGNS LIST

1 Network system
3 Communication device
10 Load
12 Slave unit
14 Master unit
16 Router

The invention claimed is:
1. A communication device comprising:
an acquisition unit configured to acquire an electrical quantity consumed by a power load from the power load;
a communication unit configured to wirelessly transmit a packet including the electrical quantity to a master unit which wirelessly transmits control signals that control electrical quantities consumed by a plurality of power loads; and
a controller configured to switch an operation of the communication unit from a first mode, in which the packet is wirelessly transmitted to the master unit by specifying a destination, to a second mode, in which the packet is wirelessly transmitted without specifying a destination, when the electrical quantity, consumed by the power load and acquired during the first mode, is equal to or greater than a first reference value, wherein the controller switches the operation of the communication unit, even if the acquired electrical quantity is equal to or greater than the first reference value, to a third mode, in which the packet is wirelessly transmitted at a frequency lower than that in the second mode and equal to or greater than that in the first mode and with a transmission power equal to or smaller than that in the second mode, when a packet wirelessly transmitted by another communication device through broadcast is received.

2. The communication device according to claim 1, wherein the communication unit wirelessly transmits, in the second mode, the packet at a frequency equal to or greater than that in the first mode and with a transmission power equal to or greater than that in the first mode.

3. The communication device according to claim 1, wherein the controller increases a transmission power when the communication unit operates in the second mode, and after elapse of a predetermined period of time, switches the operation of the communication unit to a third mode in which the packet is wirelessly transmitted at a frequency equal to or smaller than that in the second mode and equal to or greater than that in the first mode and with a transmission power equal to or smaller than that in the second mode.

4. The communication device according to claim 3, wherein the controller switches the operation of the communication unit to the third mode, when a packet, indicating that the transmitted packet was received by another communication unit during operation of the communication unit in the second mode, is received, even before elapse of the predetermined period of time.

5. The communication device according to claim 3, wherein the controller switches the operation of the communication unit to the second mode, when the electrical quantity, consumed by the power load and acquired during the third mode, becomes equal to or greater than a second reference value.

6. The communication device according to claim 1, wherein the controller reduces the first reference value when a packet, including an electrical quantity consumed by another power load and wirelessly transmitted by another communication device while the other communication device is in the second mode, is received.

7. The communication device according to claim 1, wherein the controller switches the operation of the communication unit to the third mode, when a packet, wirelessly transmitted by another communication device which is in the second mode, is received during operation of the communication unit in the first mode, even if the acquired electrical quantity is equal to or greater than the first reference value.

8. The communication device according to claim 3, wherein the second mode is a mode in which the packet is transmitted through broadcast; and the third mode is a mode in which the packet is transmitted through multicast or unicast.

9. A control method of a communication device of a power management system that manages electrical quantity consumed by a power load, the method including:

wirelessly transmitting, to a master unit which wirelessly transmits control signals that control electrical quantities consumed by a plurality of power loads, a packet including an electrical quantity consumed by a power load;

a first mode in which the packet is wirelessly transmitted to the master unit by specifying a destination;

a second mode in which the packet is wirelessly transmitted without specifying a destination; and a control step for switching from the first mode to the second mode when the electrical quantity, consumed by the power load and acquired during the first mode, is equal to or greater than a reference value, wherein in the control step, even if the acquired electrical quantity is equal to or greater than the first reference value, when a packet wirelessly transmitted by another communication device through broadcast is received, the operation of the communication device is switched to a third mode in which the packet is wirelessly transmitted at a frequency lower than that in a second mode and equal to or greater than that in the first mode and with a transmission power equal to or smaller than that in the second mode.

10. The control method of the communication device according to claim 9, wherein in the second mode, the packet is wirelessly transmitted at a frequency equal to or greater than that in the first mode and with a transmission power equal to or greater than that in the first mode.

11. The control method of the communication device according to claim 9, wherein in the control step, a transmission power is increased during operation of the communication device in the second mode, and after elapse of a predetermined period of time, an operation of the communication device is switched to a third mode, in which the packet is wirelessly transmitted at a frequency equal to or smaller than that in the second mode and equal to or greater than that in the first mode and with a transmission power equal to or smaller than that in the second mode.

12. The control method of the communication device according to claim 11, wherein in the control step, when a packet, indicating that the packet transmitted was received by another communication device during operation of the communication device in the second mode, is received, even before elapse of a predetermined period of time, the operation of the communication device is switched to the third mode.

13. The control method of the communication device according to claim 11, wherein in the control step, when the electrical quantity, consumed by the power load and acquired during the third mode, becomes equal to or greater than a second reference value, operation of the communication device is switched to the second mode.

14. The control method of the communication device according to claim 9, wherein in the control step, when a packet, including an electrical quantity consumed by another power load and wirelessly transmitted by another communication device while the other communication device is in the second mode, is received, the first reference value is reduced.

15. The control method of the communication device according to claim 9, wherein in the control step, when a packet, wirelessly transmitted by another communication device which is in the second mode, is received during operation of the communication device in the first mode, even if the acquired electrical quantity is equal to or greater than the first reference value, operation of the communication unit is switched to the third mode.

16. The control method of the communication device according to claim 11, wherein the second mode is a mode in which the packet is transmitted through broadcast, and the third mode is a mode in which the packet is transmitted through multicast or unicast.

17. A power management system comprising:
- a communication device configured to communicate wirelessly with a master unit and manage an electrical quantity consumed by a power load;
- wherein the master unit wirelessly transmits control signals that control electrical quantities consumed by a plurality of power loads; and
- wherein the communication device comprises
    - an acquisition unit configured to acquire an electrical quantity consumed by the power load,
    - a communication unit configured to wirelessly transmit a packet including the acquired electrical quantity, and
    - a controller configured to switch an operation of the communication unit from a first mode, in which the packet is wirelessly transmitted to the master unit by specifying a destination, to a second mode, in which the packet is wirelessly transmitted without specifying a destination, when the electrical quantity, consumed by the power load and acquired during the first mode, is equal to or greater than a first reference value,
    - wherein the controller switches the operation of the communication unit, even if the acquired electrical quantity is equal to or greater than the first reference value, to a third mode, in which the packet is wirelessly transmitted at a frequency lower than that in the second mode and equal to or greater than that in the first mode and with a transmission power equal to or smaller than that in the second mode, when a packet wirelessly transmitted by another communication device through broadcast is received.

18. The power management system according to claim 17, wherein the communication unit of the communication device wirelessly transmits, in the second mode, the packet at a frequency equal to or greater than that in the first mode and with a transmission power equal to or greater than that in the first mode.

* * * * *